March 13, 1962     M. KRAMCSAK, JR., ETAL     3,024,870

TRUCK LOCKS

Original Filed July 8, 1955                                 7 Sheets-Sheet 1

INVENTORS
M. Kramcsak Jr.
F. J. Fontana
BY Rockwell Bartholow
ATTORNEYS

March 13, 1962  M. KRAMCSAK, JR., ETAL  3,024,870
TRUCK LOCKS
Original Filed July 8, 1955  7 Sheets-Sheet 2

INVENTORS
M. Kramcsak Jr.
F.J. Fontana
BY Rockwell & Bartholow
ATTORNEYS

March 13, 1962 M. KRAMCSAK, JR., ETAL 3,024,870
TRUCK LOCKS
Original Filed July 8, 1955 7 Sheets-Sheet 3

INVENTORS
M. Kramcsak Jr.
P. J. Fontana
BY Rosenblee & Bartholow
ATTORNEYS

March 13, 1962 M. KRAMCSAK, JR., ETAL 3,024,870
TRUCK LOCKS
Original Filed July 8, 1955 7 Sheets-Sheet 4

INVENTORS
M. Kramcsak Jr,
F. J. Fontana
BY Rockwell Bartholow
ATTORNEYS

March 13, 1962 M. KRAMCSAK, JR., ETAL 3,024,870
TRUCK LOCKS
Original Filed July 8, 1955 7 Sheets-Sheet 6

INVENTORS
M. Kramcsak Jr.
F. J. Fontana
BY Rockwell & Bartholow
ATTORNEYS

March 13, 1962 M. KRAMCSAK, JR., ETAL 3,024,870
TRUCK LOCKS
Original Filed July 8, 1955
7 Sheets-Sheet 7

INVENTORS
M. Kramcsak Jr.
F. J. Fontana
BY Rockwell & Bartholow
ATTORNEYS

United States Patent Office 3,024,870
Patented Mar. 13, 1962

3,024,870
TRUCK LOCKS
Michael Kramcsak, Jr., and Frank J. Fontana, Bridgeport, Conn., assignors to The Bassick Company, Bridgeport, Conn., a corporation of Connecticut
Continuation of abandoned application Ser. No. 520,813, July 8, 1955. This application July 30, 1958, Ser. No. 752,142
14 Claims. (Cl. 188—5)

This invention relates to truck locks which are in the nature of anchoring and stabilizing devices used in connection with industrial trucks, warehouse trailers, and similar vehicles for fixing their position with respect to the floor or other surface over which they are movable. More particularly, the invention relates to a device adapted to be carried by the vehicle body having a foot-equipped, swingable, floor-engaging member normally held in an elevated position but adapted to be engaged with and locked in position against the supporting surface for holding the vehicle in a fixed position.

This application is a continuation of our application Serial No. 520,813, filed July 8, 1955, now abandoned, which latter application is a continuation-in-part of our application Serial No. 438,838, filed June 23, 1954, now abandoned.

An object of the present invention is to provide an improved device of the general type above mentioned.

Another object is to provide a truck lock in which a foot member adapted to be moved downwardly to the locking position is normally held at a substantial elevation with respect to the floor so that it will not be subject to interference from tools and sizable objects on the floor over which the truck is moved.

A further purpose is to make the device more conveniently operable for braking and releasing the vehicle than has been the case with previous articles of this general class.

Still another purpose is to simplify the structure and make it more compact and effective and insure against inadvertent or undesirable dislocation of the floor-engaging member from the braking position or from the inoperative or carrying position.

The device shown herein by way of example is one having an upper bracket member or housing adapted to be applied to the under surface of a truck body, the bracket being equipped with a horizontal pivot member to mount pivotally a floor-engaging member located at one side of the truck body and swingable in a vertical plane extending longitudinally of the body. This floor-engaging member includes a main portion in the form of an elongated casing or cylinder, and it also includes a slidable brake member in the form of a foot located externally of the casing or cylinder but having a stem that extends into the cylinder from the lower end of the latter. The floor-engaging member has in association therewith a lever having between its ends a movable fulcrum, each end of the lever being accessible for manipulation by the foot of the operator. The elongated casing or cylinder normally stands in a raised, substantially horizontal inoperative position close to the body of the truck. One end of this intermediately fulcrumed lever may be engaged by the foot of the operator for moving the floor-engaging member into the floor-engaging position and locking it in that position. When in the locked position the floor-engaging member can be released by manipulation of the opposite end of the lever. Upon release of the lever from a detent with which it co-operates, the floor-engaging member with its associated parts is swung pivotally by spring action so that it will again assume a substantially horizontal, inoperative position.

Figures 1, 2, 3, 4:
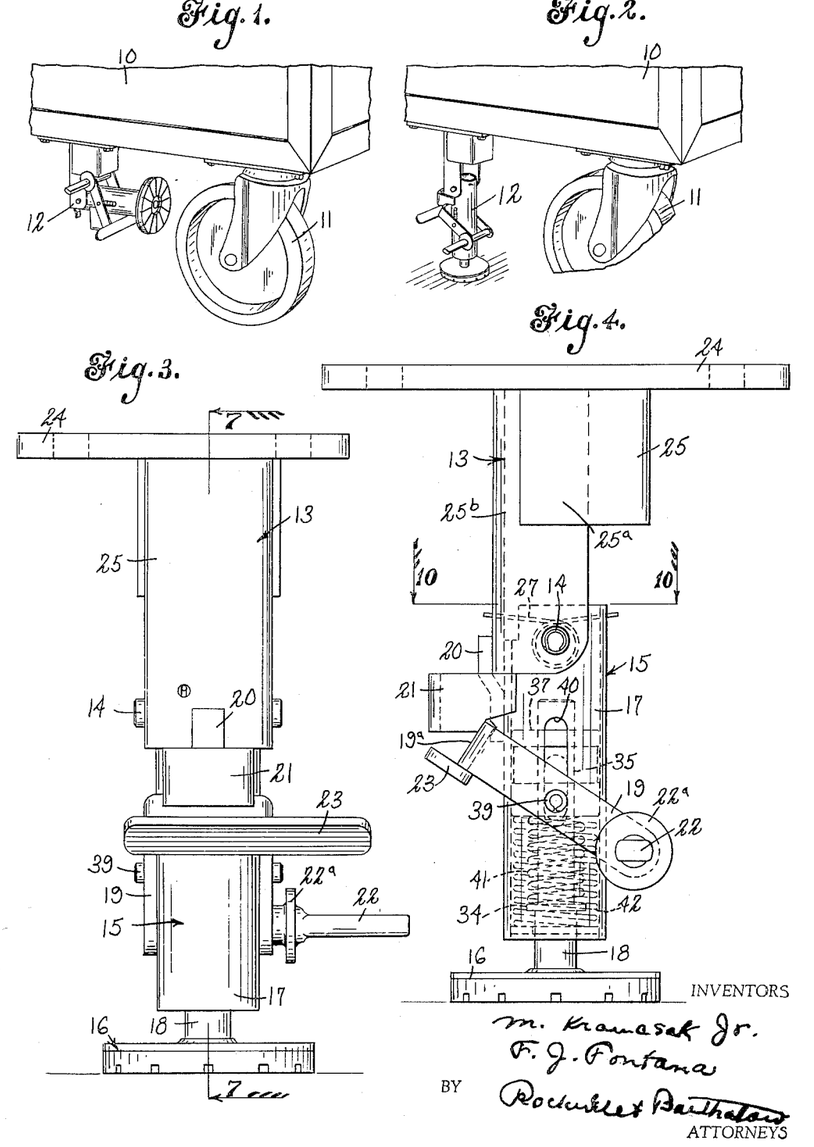
FIG. 1 is a fragmentary perspective view of a truck equipped with a truck lock embodying the invention, the truck lock being in the inoperative position.
FIG. 2 is a similar view showing the lock in the operative or braking position.
FIG. 3 is an elevation of the lock looking from the left of FIG. 2, showing the lock in the operative position.
FIG. 4 is a view of the lock at right angles to FIG. 3, showing the locking position.
Figure 5:
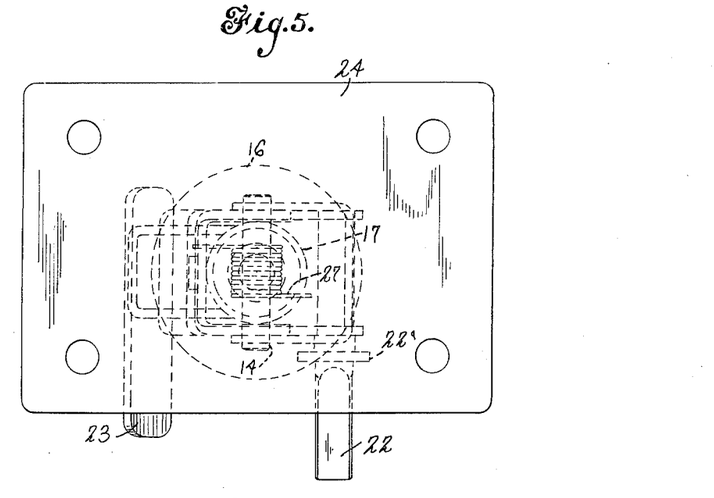
FIG. 5 is a top plan view of the lock also showing the locking position.

In FIGS. 1 and 2 there is shown an industrial truck having a body 10 supported near one end by a caster 11, and adjacent the caster is placed a truck lock 12 embodying the invention, this truck lock being shown in the inoperative position in FIG. 1 and in the operative floor-engaging position in FIG. 2.

In the drawings the upper bracket member of the locking device in the first form is indicated at 13, the pivot member carried by this bracket member at 14, the floor-engaging member generally at 15, the slidable foot member at 16, the elongated casing or brake cylinder at 17, the stem of member 16 at 18, and the intermediately fulcrumed locking lever at 19. At 20 is indicated a depending stop carried by the bracket member and adapted to arrest the swinging movement of the floor-engaging member when it reaches a vertical position, and at 21 is indicated a detent member carried by the casing or cylinder 17. At 22 is indicated a rod-like lateral extension on one end of lever 19 for foot manipulation in locking the device in floor-engaging position, and at 23 is indicated a pad at the other end of lever 19 used for releasing the floor-engaging member.

Figure 9:
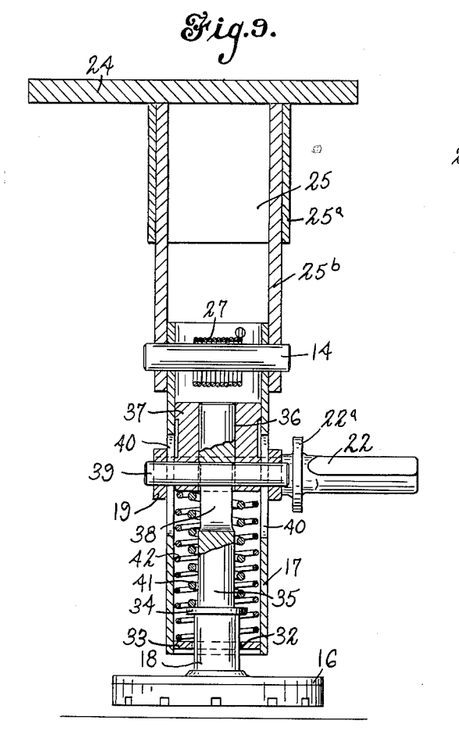
FIG. 9 is a section on line 9—9 of FIG. 8.
Figure 10:
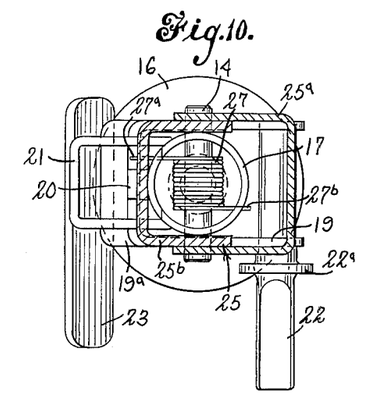
FIG. 10 is a section on line 10—10 of FIG. 4.

The upper bracket member 13 comprises a plate portion 24 having holes for bolts or screws that connect it to the truck body, and it also comprises a housing portion 25 rigid with the plate portion 24 and extending downwardly therefrom. The housing portion in this example is made up of downward extensions or parts 25$^a$ and 25$^b$ that are suitably fastened together and provide at the upper part a housing enclosed on all sides. The housing part 25$^b$, however, is extended downwardly beyond part 25$^a$, and being U-shaped in horizontal section, it provides at the lower end thereof a U-shaped portion into which the brake cylinder 17 extends. Near one end of the casing or cylinder the pivot 14 connects the cylinder with this depending housing portion into which the cylinder enters. The pivot member 14 may comprise a roll pin, an end view of which is a part of FIG. 11A, this pin being a friction member that is driven through registering holes in the housing and cylinder to provide a pivot joint that will not be subject to looseness or play. A coil spring 27 loosely surrounds the roll pin, as shown in FIGS. 9 and 10, and has an extended end 27ᵃ engaging a small hole in the housing and another extended end 27ᵇ engaging a small hole in the casing or brake cylinder, the arrangement being such that normally this spring 27 holds the brake cylinder in a substantially horizontal position, as shown in FIGS. 1 and 6, so that there is ample clearance between the brake cylinder and the floor.

Figure 6:
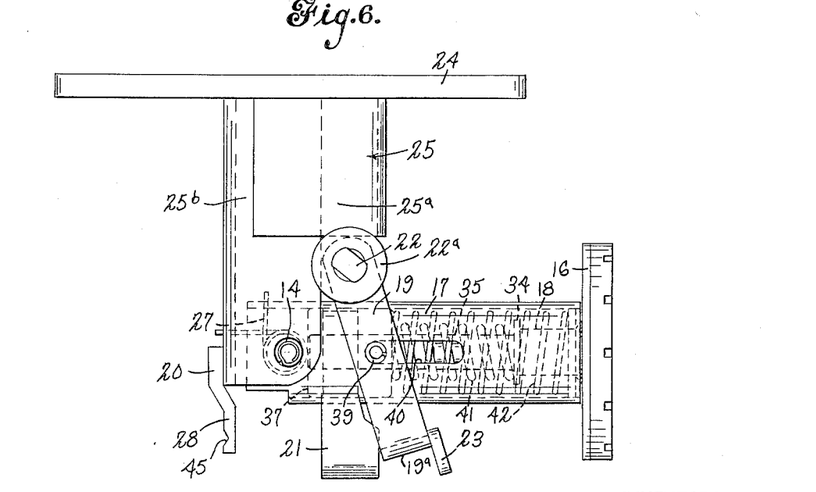
FIG. 6 is an elevation looking from the side of the truck showing the lock with the floor-engaging member in the raised inoperative position.

At the left-hand side (FIG. 4) of the lowermost U-shaped portion 25ᵇ of the bracket 13 the previously mentioned stop member is applied to the housing in a fixed position, this member being formed as a metal strip or strap, the upper portion of which is rigid with the housing and the lower portion 28 of which is laterally offset and extended downwardly beyond the housing as shown in FIG. 6. This part 28 rigid with the housing provides a depending stop with which the cylinder casing is adapted to make contact for the purpose of arresting the casing when it is swung downwardly to a vertical position. For holding the casing in this vertical position, which is the locking position, the detent or cam member 21 is provided that co-operates with the locking lever 19. The detent 21 is a metal part generally U-shaped in plan connected as by welding to the wall of the cylinder 17 in a location in which it will extend around the lower part of the stop 20 when the device is in the locking position (FIG. 4). The terminals of the U-shaped detent part 21 are the portions which are attached to the cylinder, and in the locking position of the device these parts are adjacent the left-hand end (FIG. 4) of the lever 19 and adapted to coact therewith in locking the floor-engaging member against the floor.

The intermediately fulcrumed lever 19 is located below the detent 21 and in plan is generally U-shaped, having side members which are integral with a cross member 19ᵃ. This cross member 19ᵃ in the position of FIG. 4 extends under a portion of the detent member 21 and presents an upper edge that is adapted to co-operate with the side portions of detent 21 and with the lower part 28 of stop 20, as hereinafter more particularly described, for locking the floor-engaging member in the braking position. At the opposite open end of the U member providing the lever 19 a rod having the extension 22 is provided, this rod having a main portion which is extended through and fastened to the ends of the U. Integral with this main portion of the rod is the extension 22 which is adjacent the outer side of the lever and adapted to be engaged by a person's foot for depressing that end of the lever.

Figures 7, 8:
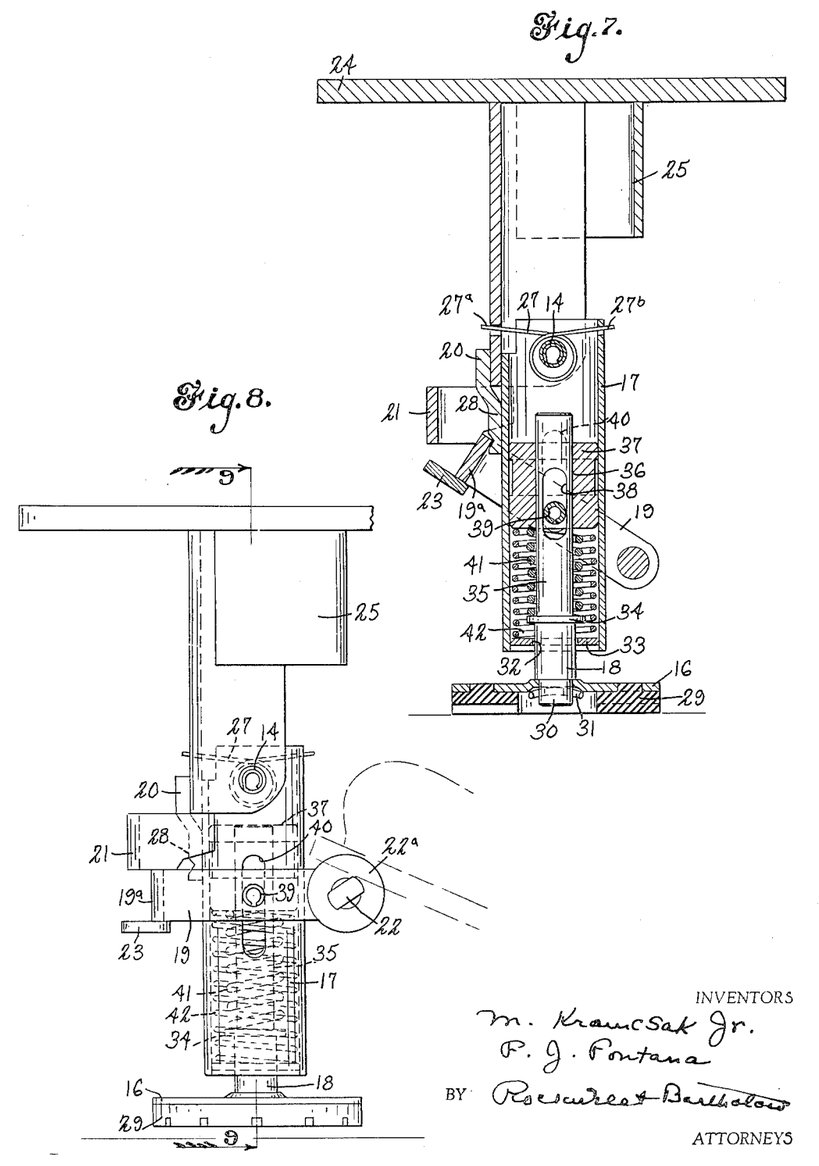
FIG. 7 is a section on line 7—7 of FIG. 3.
FIG. 8 is a view of the lock similar to FIG. 4 but showing the position of the parts as the foot member is being moved toward the floor.

The foot member 16 is shown as being of disk shape and having a liner 29 of suitable composition and frictionally engaging the floor. The stem 18, as shown in FIG. 7, has a reduced lower end portion 30 projecting downwardly through a hole in the metal part 16 and part 16 may be held on portion 30 by means such as a cotter pin 31. The stem 18 extends into the casing 17 through a hole 32 in a metal closure member 33 which closes the casing at the lower end. Within the casing the stem 18 is provided with an integral collar 34. Above collar 34 the diameter of the stem is reduced, as shown at 35, and this portion 35 extends through a bore 36 in a piston 37 slidable in the casing. The piston may be formed as a block having the profile shown in FIG. 7. As shown in FIG. 7, the stem of the floor-engaging foot extends upwardly through a bore 36 of the piston, and in the position of FIG. 7 the upper end of the stem protrudes from the upper end of the piston. In a location comparatively close to the upper end of the stem 18, the latter is provided with a longitudinal slot 38. Through this slot extends a pivot member constituted by a roll pin 39 shown in detail in FIG. 11A, which roll pin is extended through holes in the opposite side members of lever 19 and through holes in the piston 37 and provides a pivot that enables lever 19 to be swung in a vertical plane by actuation from either end of the lever. This roll pin 39 not only extends through the piston and the slot 38 in the foot stem, but also through opposite slots 40 provided in the wall of the casing 17, and thus the lever 19 is enabled to be moved with respect to a lever fulcrum that, within limits, is shiftable lengthwise of the casing and lengthwise of the foot stem. The slot 38 engaged by the roll pin permits a limited movement of the stem lengthwise of the cylinder. It is understood that by the construction above described the lever is fulcrumed directly to the piston.

The pad 23 at the left-hand end of the lever 19 (FIG. 4) is constituted by an elongated metal plate which in the locked position of the truck lock underlies the end portion of the U constituting lever 19, and is suitably fastened thereto as by welding. This plate is disposed across the connecting portion of the U, and at one end extends laterally from the truck so that this end or extension can be readily engaged by the operator's foot. This extended part of the pad is at the same side of the truck lock as the extended part of the rod 22.

Between the upper face of the collar 34 on the foot stem and the lower face of piston 37 (FIG. 7) is interposed a helical spring 41. The function of this spring is to press the foot member against the floor when the truck is to be locked in position. This spring 41 encircles the stem portion 35 rather closely. Another and lighter spring 42, also of helical form and larger diameter than spring 41, is interposed between the lower face of the piston and the head part 33 at the lower end of the cylinder. The function of spring 42 is to move the foot member with respect to the cylinder by exerting pressure against the lower surface of the piston so that when the device is in the released position shown in FIG. 6, the foot member will be in a retracted position with respect to the cylinder. In this inoperative position of the truck lock the foot is substantially in abutment with the end of the cylinder, as shown in FIG. 6.

Figure 11:
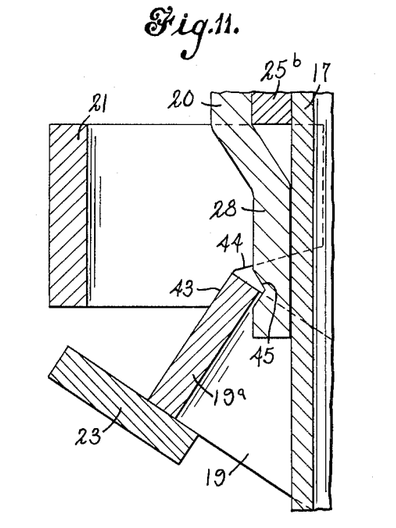
FIG. 11 is a detail sectional view showing on a larger scale certain parts in the locking position.
Figure 11A:
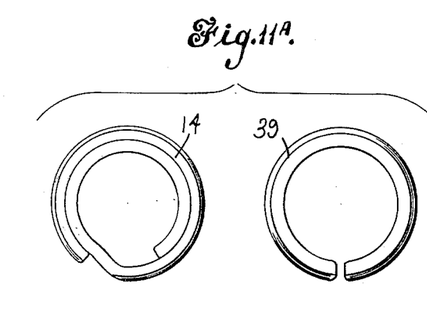
FIG. 11A shows in detail the roll pins used in this form of the device.
Figure 12:
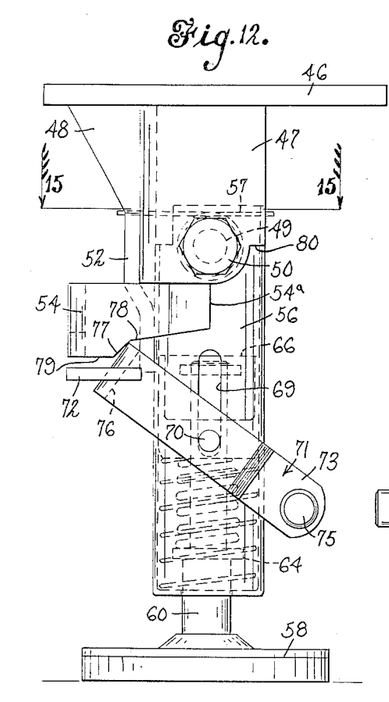
FIG. 12 is a view similar to FIG. 4 showing a modified form of lock in the locking position.
Figure 13:
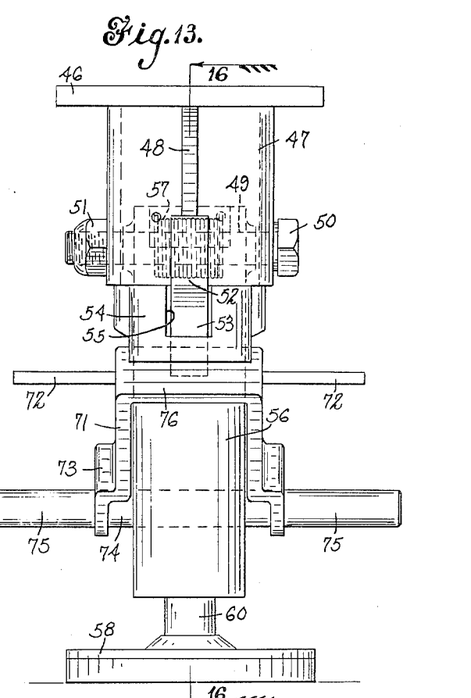
FIG. 13 is an elevation at right angles to FIG. 12.

Reverting to the detent member 21, the terminal portions of this U-shaped member have lower edge portions, shaped as shown in FIGS. 4 and 11, to co-operate with the crossbar portion 19ᵃ of lever 19. These edge portions comprise, at each side of the detent, a straight edge portion 43 and another straight edge portion 44, these portions in conjunction providing a downwardly facing notch at the respective side of the detent. Portion 43 extends upwardly from the lower edge of the detent at a sharp inclination, and portion 44 extends from 43 toward the terminal of the detent at a less inclination to form an obtuse angle. It may also be noted at this point that in the locked position of the brake, part 28 of stop member 20 is located between the terminals of the detent in the position shown in FIG. 11, and it is further noted that the stop part 28 on its outer face relatively to the cylinder has a transverse notched part or groove 45 shaped as a shallow V adapted to co-operate with member 19ᵃ in the manner hereinafter pointed out.

When the truck lock is in the position shown in FIG. 6, the foot member, cylinder, locking lever and detent member are all held at considerable distance above the floor so as not to make contact with tools or sizable objects on the floor as the truck is moved from place to place. The parts referred to, which are held in upward position, will be at approximately the level of the lower end of stop member 20. When the parts are in this position, lever 19 is very slightly inclined to the vertical, the part 19ᵃ being in contact with the adjacent straight edge portion of the detent and the side portions of lever 19 at the upper end thereof being substantially in contact with the bracket member in the angle between the parts 25ª and 25ᵇ, there being suitable contact between the upper end of the lever and the bracket housing to hold the upwardly urged cylinder in a substantially horizontal position, as shown in FIG. 6. In this form the side portions of the lever 19 enter the opening in the housing to some extent, and at one side of the lever an integral collar 22ª is provided on the rod 22, which collar in this position (FIG. 6) somewhat overlies the adjacent wall of the housing.

Supposing the floor-engaging member to be in the upper position of FIGS. 1 and 6, the lock can be applied by a swinging movement of lever 19 brought about by the operator placing his foot against portion 22 of the lever. This portion 22 is pushed to the right and downwardly with reference to FIG. 1, so as to move the lever 19 on its fulcrum in a clockwise direction. By the downward swinging of this part of the lever, both of the springs 41 and 42 are compressed owing to the downward displacement of the lever fulcrum, and, as the fulcrum member moves downwardly in the slots in the cylinder, the cylinder is being swung in a clockwise direction. Also as a result of the movement of the lever fulcrum relatively to the cylinder, the end of lever 19 adjacent the detent 21 moves relatively to the detent. FIG. 8 shows a position of the parts in which the foot member 16 is near the floor, with the lever 19 substantially horizontal. In this position the upper edge of lever 19 at the left-hand end (FIG. 8) engages straight edges of the detent to the left of the notch 43, 44. Upon continued movement of the lever in the same direction, the foot member 16 abuts the floor and the spring 41 is further compressed between the piston and the collar 34 so that strong braking pressure is exerted against the floor.

It is to be noted that, when the position of FIG. 8 is reached, and before full contact is had between the foot member and the floor, the cylinder makes contact with the stop member 28 which acts as a stop to arrest the swing of the cylinder when the latter reaches a substantially vertical position. Thus when the device is about to be locked in the truck-locking position, the cylinder and its associated parts are firmly held in place. Then the only further movement required is the continued push on the lever for the purpose of moving it into locking engagement with the obtusely angled notch 43, 44 in the detent and with the transverse groove 45 of the stop member. This final position of the locking parts is shown in detail in FIG. 11. In this position one corner of the section of cross member 19ª of the lever is at the bottom of the notch 43, 44, and the other corner within the groove 45. When the lever reaches the final position, therefore, it is positively interlocked with the detent carried by the cylinder or casing, and with the stop member that is rigid with the bracket housing. It will be noted from FIG. 4 that in this locked position the lever 19 is at an angle of approximately 45° to the vertical.

The truck lock being in the locked position shown in FIG. 2, release can be effected by the operator placing his foot against the extended end of pad 23 and pressing it in a downward and counterclockwise direction. By this movement the upper edge of lever part 19ª is moved out of the notches in the detent and in the stop member, and the spring 27 being released acts to raise the floor-engaging member to the inoperative position. It is understood that the floor-engaging member is self-elevating, and upon release of the detent means is moved to the raised position without the need of any manipulation on the part of the operator.

When the detent means is released the spring 42, acting against the piston, causes the foot member to be drawn to the retracted position owing to the engagement of the fulcrum pin with the foot stem at the upper end of the slot 38.

The arrangement shown in FIG. 11, where the lever in the locking position has projection and notch engagement with both the detent or cam and the depending cylinder stop, is very advantageous in preventing inadvertent or undesirable dislocation of the floor-engaging member and providing a very secure lock arrangement. The movable manipulating or operating member carried by the brake cylinder is enabled to be locked securely on the one hand to a detent rigid with the cylinder and on the other hand with a fixed stop on the member pivotally mounting the cylinder.

In the modified form shown in FIGS. 12 to 17, the bracket member attached to the truck body comprises an upper attaching plate 46 and a depending member 47 of U-shaped section horizontally, and also a reinforcing fin 48 in the angle between these parts. The pivot member 49 for the cylinder is in the form of a bolt having a head 50 at one end and a nut 51 at the opposite end. Below the fin 48 a metal strap 52 is fixed to the housing of the bracket member, and this strap has a portion 53 offset and projecting downwardly from the housing as in the form previously described. This depending member acts as a stop for the brake cylinder, as in the previously described embodiment. A detent 54, similar in some respects to the previously described detent member, is fixed to the side of the brake cylinder. This detent 54 has in the intermediate portion of the U a cut-out 55 which enables the detent in being swung about pivot 49 to clear the stop part 53.

Figure 14:
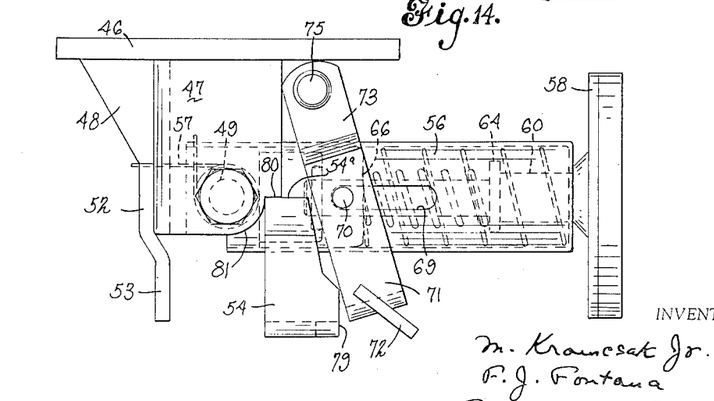
FIG. 14 is an elevation showing this device in the raised inoperative position.
Figure 15:
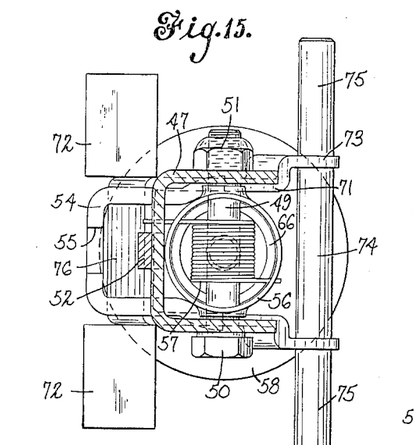
FIG. 15 is a section on line 15—15 of FIG. 12.

The casing or cylinder 56 is pivoted to the housing portion of the bracket by the pivot bolt 49. In the upper or inoperative position of the floor-engaging member a portion of the latter extends horizontally into the open side of the member 47. Within the casing and around the pivot bolt is a helical spring 57 having one end extended into a hole in the bracket and the other end extended into a hole in the cylinder, as in the form first described, said spring normally holding the cylinder in a substantially horizontal position, as shown in FIG. 14.

The foot member 58 is of disk shape and has a liner 59 of suitable composition for frictionally engaging the floor. The stem 60 of the foot member has a reduced lower end portion 61 projecting downwardly through a hole in the metal part of the foot member, and the foot member is held on portion 61 by a cotter pin 62. In this case the brake cylinder or casing has an integral lower head 63. On the stem within the cylinder is an integral collar 64. A strong helical spring 65 is interposed between the collar 64 and the bottom of the piston 66 (FIG. 16), which piston in this form is of cup shape, having a thick bottom and a thin side wall integral with the bottom. The upper extremity of the stem 60 (FIG. 16) is above the bottom wall of the piston, and such extremity is provided with a crosspin 67 which overhangs the bottom part of the piston and serves as a means for limiting downward movement of the foot member with respect to the piston. The helical spring 65 is similar to the previously described spring 41 and serves to force the foot member against the floor. A lighter helical spring 68 is interposed between the lower face of the piston and the lower head of the cylinder. The function of spring 68 is to exert pressure against the lower surface of the piston so that, when the floor-engaging member is in the position shown in FIG. 14, the foot member will be in a retracted position with respect to the cylinder.

The cylinder 56 is provided at opposite sides with vertically elongated slots 69. These slots afford clearance for fulcrum pins 70 by means of which the lever 71 is fulcrumed with respect to the piston. The fulcrum pins 70 are placed in diametrically arranged bores extending laterally in the piston, each fulcrum pin having a portion of its length fixed within the piston and another portion of its length extended through the corresponding slot 69 and into a side portion of the lever 71.

The lever 71 is provided intermediate of its ends on the fulcrum pins 70, this lever being substantially U-shaped in plan and straddling the cylinder and being operable from respective ends for locking and releasing the floor-engaging member, as in the form first described. However, in this case the intermediate portion of the U that forms the lever 71 has rigidly attached thereto at opposite sides, as by welding, operating pads 72 engageable by the foot of the operator for releasing the lock. At the opposite extremity of lever 71 the side parts of the U have laterally offset terminal portions 73 in which is secured, as by welding, a rod 74 extending crosswise of the lever and having end extensions 75, one of which can be engaged by the person's foot for the purpose of clamping the foot member against the floor. The side parts of the lever are close to the cylinder and the fulcrum pins 70 are extended through holes in these parts so as to permit the lever to swing on the fulcrum pins.

Figure 16:
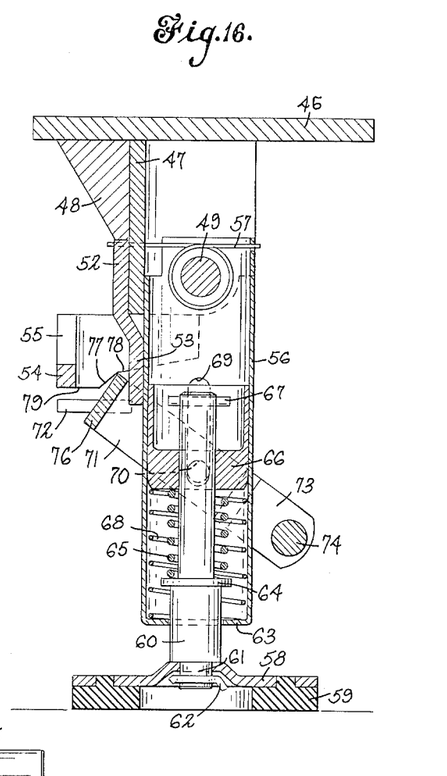
FIG. 16 is a section on line 16—16 of FIG. 13.
Figure 17:
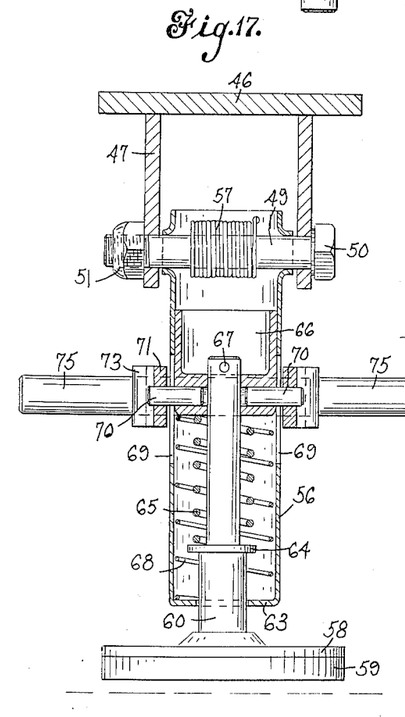
FIG. 17 is a sectional view at right angles to FIG. 16, showing the position of the parts just prior to the engagement of the foot member with the floor.

For co-operation with the detent or cam member 54, a transverse member 76, forming a part of the U that constitutes lever 71, is disposed beneath the detent 54 when the device is in the locking position, as shown in FIG. 16. The lower side parts of the detent (FIG. 16) are cut away to provide inclined edge portions 77 and 78 that are at an obtuse angle to each other. The edge portion 77 joins a straight lower edge portion 79 and is at a considerable angle to the vertical (FIG. 16), while the inclined edge portion 78 is almost horizontal, extending to the terminal of the detent (FIG. 16). As shown in FIG. 16, in the locked position of the parts the cross portion 76 of the lever has a corner of its cross section engaged in the obtusely angled notch or depression formed by portions 77, 78 and another corner in close proximity to the adjacent plane face of the stop member 52, 53. Thus the upper edge of portion 76 is confined between members at opposite sides thereof.

When the truck lock is not in use, the parts occupy the relative positions shown in FIG. 14, and, as before, this prevents the parts from making contact with objects on the floor when the truck is moved from place to place. When the parts are in this position, the terminal portions 54ª of the detent will be engaged with shoulders 80 at the respective sides of the bracket member, each shoulder having a horizontal surface. This shoulder provides a stop for the floor-engaging member and prevents the cylinder from being moved upwardly beyond a horizontal position. The stop shoulders 80 are somewhat above the level of the lower edges of the housing portion of the attaching bracket, and at each side of the housing a curved edge portion 81 (FIG. 14) of the housing portion connects the lower edge with the shoulder 80. With this construction, when the floor-engaging member is released from the locking position and moves to the inoperative position of FIG. 14, corner portions of the detent move along the curved edges 81 until these corner portions engage and are seated against the shoulders 80.

It is believed that, from the foregoing description of this form of the device, its mode of operation will be clear, this being generally similar to that of the form first described.

Figure 18:
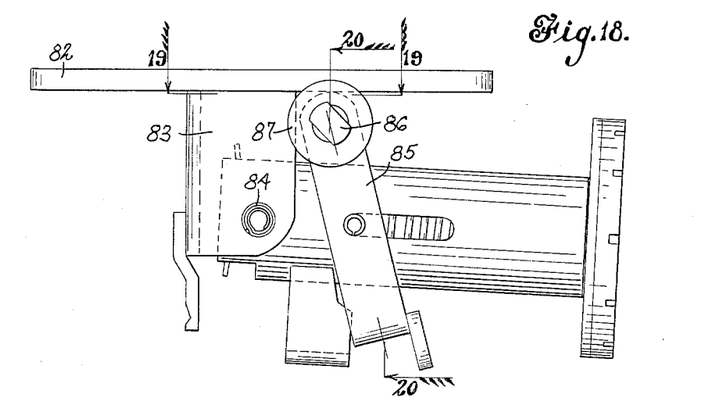
FIG. 18 is a side elevation of a further form of truck lock showing the floor-engaging member in the raised position.
Figure 19:
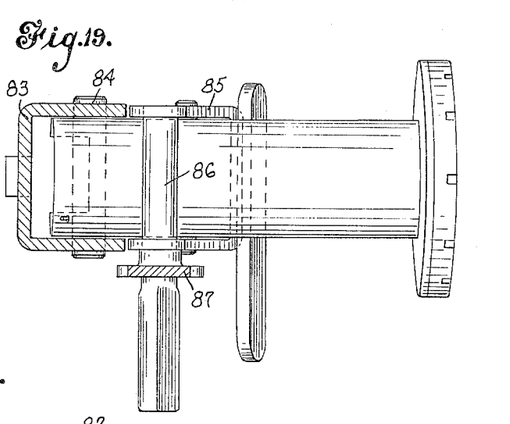
FIG. 19 is a section on line 19—19 of FIG. 18.
Figure 20:
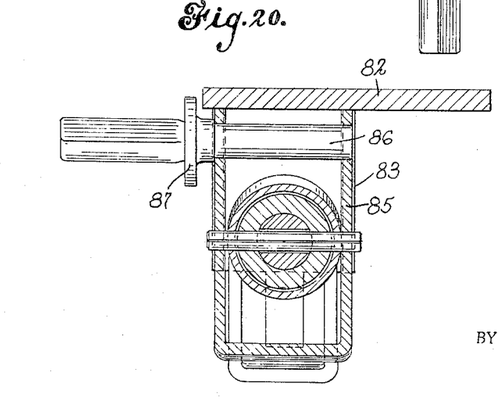
FIG. 20 is a section on line 20—20 of FIG. 18.

The third form of the invention, illustrated in FIGS. 18 to 20, has a floor-engaging member and associated lever, detent, and stop of the structure employed in the first form. However, in this form the housing, depending from the attaching plate, is of considerably less depth and consists essentially of a single member, U-shaped in plan, to which the floor-engaging member is pivoted. Here the attaching plate 82 has suitably fastened thereto as by welding the U-shaped housing portion 83 and the floor-engaging member is pivoted to the housing by means of the roll pin 84. The intermediately fulcrumed lever 85 is like that of the first form, and when the floor-engaging member is in the upper inoperative position the end of the lever equipped with the crossrod 86 is located in the angle between the housing 83 and the attaching plate, the collar 87 of this rod somewhat overlying the adjacent portion of the attaching plate and housing. In the upper position of the floor-engaging member the side members of the lever 85 make contact at their ends with the under surface of the attaching plate as shown in FIG. 20.

The present disclosure is by way of example only, and it is to be understood that various modifications and changes may be made without departing from the principles of the invention and the scope of the claims.

What we claim is:

1. In a truck lock, an upper bracket, a depending floor-engaging member pivoted thereto and having a floor-engaging foot with a protractable and retractable stem, said member having an upright position for locking the truck and a substantially horizontal inoperative position, a lever having a movable fulcrum intermediate its ends with the floor-engaging member, a spring between the lever and foot urging them apart, said lever being operable to swing the member downwardly and to protract the stem of said foot, and a detent associated with said floor-engaging member engageable with said lever for latching said foot in truck-locking position, with the lever being depressible at one end for latching the floor-engaging member in truck-locking position and depressible at the other end for releasing the floor-engaging member.

2. In an anchoring device such as described, an attaching member for application to a truck body, a depending elongated floor-engaging member pivoted to said attaching member and swingable in a vertical plane, said floor-engaging member comprising an upper elongated casing pivoted to said attaching member, a foot member having a stem projecting upwardly into said casing, a piston in said casing surrounding said stem, a spring interposed between said piston and a part on said stem to press said foot member in the direction of the floor, and a lever having a movable fulcrum on said piston, said lever having one end which, when depressed, presses the foot member against the floor, said lever having a second end cooperating with a detent on said casing member to latch the lever in anchoring position, said lever being a duplex lever straddling said casing member and fulcrumed upon fulcrum means carried by said piston and extending through oppositely located slots extending lengthwise of the casing.

3. In an anchoring device such as described, a bracket member applicable to a lower part of the truck body, and a floor-engaging member pivoted to said bracket member to swing in a vertical plane, said floor-engaging member including a spring-pressed floor-engaging foot member, said bracket member being equipped with a stop to arrest the floor-engaging member when the latter is swung downwardly to a vertical position, said floor-engaging member being equipped with a stationary detent and with a lever engageable with said detent to latch the floor-engaging member in upright position against said stop, said lever also urging the spring-pressed foot member to engagement with the floor.

4. In a truck lock for anchoring a truck on its supporting surface, an elongated floor-engaging member depending from and having pivotal relation to the truck to swing in a vertical plane and carrying a slidable foot member engageable with the truck-supporting surface, means comprising a pivoted foot-operable lever and a cooperating detent member carried by said floor-engaging member for latching said foot member in truck-anchoring position, said lever having fulcrum structure slidable lengthwise of the floor-engaging member, and a compression spring interposed between a part of the foot member and the fulcrum structure operable to urge the foot member against the truck-supporting surface.

5. In a truck lock for anchoring a truck on its supporting surface, an elongated floor-engaging member depending from and having pivotal relation to the truck to swing in a vertical plane and carrying a slidable foot member engageable with the truck-supporting surface, and a lever having fulcrum structure secured to and slidable lengthwise of the floor-engaging member and spring connected to the foot member, said lever being operable to swing the floor-engaging member to the truck-anchoring positions and to urge the foot member against the supporting surface, with the lever being depressible from one end for anchoring the truck lock and being depressible from the opposite end for releasing the truck lock.

6. In an anchoring device such as described, an attaching bracket for application to a truck body open at one side and having a depending fixed stop at the opposite side, a pivot member extending across said bracket member, a casing pivotally mounted on said pivot member and swingable in a vertical plane and engageable to be held in a fixed upright position by said stop, said casing being swingable to an upper position in which it extends laterally into the open side of the bracket, a fixed detent carried by the casing adjacent its pivot, a latching lever carried by the casing to cooperate with said detent, and a floor-engaging foot having a protractable stem disposed in said casing and operably connected to said lever, said detent and lever intercooperating to latch said casing in upright position with said foot protracted.

7. In an anchoring device such as described, an attaching member for application to a truck body, a depending elongated floor-engaging member pivoted to said attaching member and swingable in a vertical plane, said floor-engaging member comprising an upper elongated casing pivoted to said attaching member, a foot member having a stem projecting upwardly into said casing, a piston in said casing surrounding said stem, a spring interposed between said piston and a part on said stem to press said foot member in the direction of the floor, and a lever having a movable fulcrum on said piston, said lever having one end which, when depressed, presses the foot member against the floor, said lever having a second end cooperating with a detent on said casing member to latch the lever in anchoring position.

8. In a lock for anchoring a truck on its supporting surface, the combination of a member depending from and having pivotal relation to the truck to swing from a lower anchoring position to an elevated inoperative position, a foot reciprocably carried by the member and movable to a position engaging the surface, spring structure abutting the member for urging the foot from engagement with the surface, a lever carried by the member on a radially movable pivot and operatively connected to the foot, said lever being operable to swing the member to its anchoring position and to move the foot to its surface engaging position, and latch structure secured to the member for receiving and holding a part of the lever spaced from the pivot upon movement of the lever into a position in which the foot is urged into engagement with the surface.

9. In a lock for anchoring a truck on its supporting surface, the combination of a bracket adapted to be secured to the truck, a member depending from and having pivotal relation to the bracket to swing from a lower anchoring position to an elevated inoperative position, a foot reciprocably carried by the member and movable to a position engaging the surface, a lever carried by the member on radially movable pivot structure, a spring engageable with the foot and pivot structure operable to urge the foot away from the bracket, said lever being operable to swing the member to its anchoring position and to move the foot to its surface engaging position, and an at least partially fixed latch structure associated with the member for receiving and holding a part of the lever spaced from the pivot upon movement of the lever into a position in which the foot is urged into engagement with the surface.

10. In a lock for anchoring a truck on its supporting surface, the combination of a bracket adapted for connection with the truck, a member pivotally carried by the bracket to swing from a lower anchoring position to an elevated inoperative position, a foot reciprocably carried by the member and movable to a position engaging the surface, structure depending from the bracket abutted by the member in the anchoring position of the member, a lever carried by the member on a radially movable pivot and having operative connection with the foot, said lever being operable to swing the member to its anchoring position and thereafter move the foot to its surface engaging position, and an at least partially fixed latch assembly associated with the structure for receiving and holding a part of the lever spaced from the pivot upon movement of the lever into a position in which the foot is urged into engagement with the surface.

11. In a lock for anchoring a truck on its supporting surface, the combination of a bracket adapted for connection with the truck, a hollow member carried by and having pivotal relation to the bracket to swing from a lower anchoring position to an elevated inoperative position, a piston assembly reciprocably carried by the member, a foot slidably carried by the assembly and movable to a position engaging the surface, a spring engaged with the member and assembly to urge the assembly away from the surface, a second spring engageable with the assembly and a part of the foot to urge the foot toward the surface, a lever carried by the assembly on a pivot movable with the assembly relative to the member and operable to swing the member to its anchoring position and to move the assembly toward the surface so that the second spring urges the foot to its surface engaging position, and latch structures associated with the bracket and member for receiving and holding a part of the lever spaced from the pivot upon movement of the lever into a position in which the foot is urged into engagement with the surface.

12. In a truck lock for anchoring a truck on its supporting surface, the combination of a bracket adapted for connection with the truck, a hollow member having a pivotal connection with the bracket to swing from a lower anchoring position to an elevated inoperative position, a piston reciprobably received in the member, a foot carried by the piston and movable with the piston to a position engaging the surface, spring structure acting between the piston and member to urge the piston toward the pivotal connection, a spring between the piston and a part of the foot to urge the foot away from the pivotal connection and into engagement with the surface, a lever carried by the piston on a pivot movable relative to the member and operable to swing the member to its anchoring position and to move the piston away from the pivotal connection so that the spring urges the foot to its surface engaging position, and a latch structure including a stop carried by the bracket and a detent carried by the member for receiving and holding a part of the lever spaced from the pivot upon movement of the lever into a position in which the foot is urged into engagement with the surface.

13. In a lock for anchoring a truck on its supporting surface, comprising a bracket adapted for connection with the truck, a hollow member secured to the bracket and having a longitudinal slot, a piston reciprocable within the member, a pit extending from the piston through the slot for maintaining the piston in the member, a foot having a stem protruding into the member and through an aperture in the piston, means on the stem engageable with the piston for limiting longitudinal movement of the stem relative to the piston, a compression spring engaged with the member and piston for urging the piston toward the bracket, a second spring disposed around the stem engageable with the piston and a part of the stem for urging the foot toward the supporting surface, a lever pivotally supported by the pin for moving the piston toward the supporting surface and into engagement with the second spring to urge the foot against the supporting surface, and latch means associated with the lever for maintaining the foot in the anchoring position.

14. In a lock for a truck body comprising an open end bracket secured to the underside of the truck body, a stop on the opposite end of the bracket facing the open end, a member having a pivotal connection at one end with the bracket and swingable between abutment with the stop and alignment with the open end, spring structure secured to the bracket and member to swing the member to the alignment position, said member having longitudinal slots intermediate its ends, a piston aligned with the slots, pin means etxending from the piston through the slots, a spring engaged with a portion of the member and piston for urging the piston toward the pivotal connection, a foot having a stem protruding toward the pivotal connection, a second spring engageable with the piston and a portion of the stem for urging the foot away from the pivotal connection, means on the stem engageable with the piston to limit movement of the stem relative to the piston, a detent secured to the member, and a lever pivotally connected intermediate its ends to the pin means operable to swing the member and to move the piston, the lever being engageable at one end with the detent and the stop to lock the member in the abutment position with the opposite ends of the levers being depressible respectively to lock and to release the member in and from the abutment position.

References Cited in the file of this patent

UNITED STATES PATENTS

| | | |
|---|---|---|
| 1,183,107 | Norton | May 16, 1916 |
| 1,422,285 | Majors | July 11, 1922 |
| 1,495,916 | McNames | May 27, 1924 |
| 1,783,822 | Bolard | Dec. 2, 1930 |
| 1,872,872 | Bendix | Aug. 23, 1932 |
| 1,950,261 | Neymours et al. | Mar. 6, 1934 |
| 2,236,281 | Anderson | Mar. 29, 1941 |
| 2,360,874 | Herold | Oct. 24, 1944 |